United States Patent [19]

Matsumoto et al.

[11] Patent Number: 4,967,618
[45] Date of Patent: * Nov. 6, 1990

[54] ELECTRIC STEERING APPARATUS

[75] Inventors: Sakae Matsumoto, Takasaki; Mitsuo Ichikawa, Maebashi, both of Japan

[73] Assignee: Nippon Seiko Kabushiki Kaisha, Tokyo, Japan

[*] Notice: The portion of the term of this patent subsequent to Jan. 16, 2007 has been disclaimed.

[21] Appl. No.: 426,033

[22] Filed: Oct. 24, 1989

Related U.S. Application Data

[63] Continuation of Ser. No. 178,229, Apr. 6, 1988, Pat. No. 4,893,518.

[30] Foreign Application Priority Data

Apr. 17, 1987 [JP] Japan ............... 62-57545[U]

[51] Int. Cl.$^5$ ............................................. B62D 1/18
[52] U.S. Cl. ............................ 74/493; 74/409; 74/441; 74/495; 280/775
[58] Field of Search ................ 74/89.15, 383, 409, 74/424.8 R, 441, 493, 495; 280/775

[56] References Cited

U.S. PATENT DOCUMENTS

| | | | |
|---|---|---|---|
| 4,503,504 | 3/1985 | Suzumura et al. | 74/493 |
| 4,528,862 | 7/1985 | Goldowsky | 74/409 |
| 4,602,520 | 7/1986 | Nishikawa et al. | 74/493 |
| 4,633,732 | 1/1987 | Nishikawa et al. | 74/493 |
| 4,669,325 | 6/1987 | Nishikawa et al. | 74/89.15 |
| 4,691,587 | 9/1987 | Farrand et al. | 74/493 |
| 4,739,673 | 4/1988 | Ishikawa et al. | 74/493 |
| 4,753,122 | 6/1988 | Nishikawa et al. | 74/424.8 A |

FOREIGN PATENT DOCUMENTS 3618266 10/1987 Fed. Rep. of Germany.
59-230861 12/1984 Japan.
63-51867 4/1988 Japan.

OTHER PUBLICATIONS

"How to Provide for Backlash in Threaded Parts", Bower, *Mechanisms, Linkages, and Mechanical Controls*, 1965, pp. 188-189.

Primary Examiner—Leslie A. Braun
Assistant Examiner—Scott Anchell
Attorney, Agent, or Firm—Shapiro and Shapiro

[57] ABSTRACT

An electric steering apparatus which effects position adjustment by electric drive has a screw shaft parallel to upper and lower columns. A nut member rotatably supported by a housing fixed to a bracket is fixed against movement in the axial direction of the screw shaft and threadably engaged with a screw portion provided at one end of the screw shaft. In a preferred embodiment the other end of the screw shaft is pivotally connected to the upper column for pivotal movement relative to the bracket in the direction of tilt. The nut member is self-aligning in the housing, and the nut member is rotatively driven by an electric motor to move the screw shaft in the axial direction and thereby move the upper column, whereby position adjustment can be accomplished. The apparatus is provided with a back-lash preventing device in which the screw shaft is pressed against the nut member in a radial direction and the threadably engaged portions of the screw shaft and the nut member are urged against each other.

10 Claims, 5 Drawing Sheets

ELECTRIC STEERING APPARATUS

This is a continuation of application Ser. No. 178,229, filed Apr. 6, 1988, now U.S. Pat. No. 4,893,518.

BACKGROUND OF THE INVENTION

1. Field of the Invention

This invention relates to improvements in an electric tilt or telescopic steering apparatus for a vehicle, and more particularly to an electric steering apparatus in which occurrence of back-lash of a position adjusting portion can be effectively prevented.

2. Related Background Art

An electric steering apparatus is such that the position of a steering wheel can be adjusted by the drive force of an electric motor, and there are known an electric steering apparatus in which a steering wheel tilts and an electric steering apparatus in which a steering wheel moves axially (telescopically). In any of these conventional types, a screw shaft is connected to an upper column and a nut member threadably engaged with the screw shaft is supported by a bracket and is rotated by an electric motor to thereby move the screw shaft in the axial direction and adjust the position of the steering wheel.

In the conventional tilt type electric steering apparatus, in addition to the screw shaft and a hinge portion, a speed reduction mechanism and a mechanism for changing the direction of transmission of the drive force (a gear, etc.) are disposed in the path for transmitting the drive force of the electric motor to the upper and, back-lash exists in each of these portions Individual back-lash in each portion is small, but the cumulative effect may be great, whereby back-lash appears in the direction of tilt of the steering wheel. This spoils the sense of rigidity, and has led to the problem that during driving, stability of manipulation is lacking and annoying vibrations and noise occur.

On the other hand, in the telescopic type electric steering apparatus, the hinge portion is absent but the speed reduction mechanism and the mechanism for changing the direction of transmission exhibit back-lash as in the tilt type electric steering apparatus. One such an electric steering apparatus, is shown, for example, in Japanese Laid-Open Patent Application No. 230861/1984, but this apparatus has disadvantages in that the number of parts is great and the structure is complex and that the presence of two fulcrums for a link leads to great back-lash and cumbersomeness of operation.

In the conventional tilt apparatus, the upper column pivotally moves and thus, the locus of movement of a particular point of the upper column describes an arc. If a nut is directly coupled to the upper column without the use of a link, the direction of movement of the nut member which provides a screw shaft does not coincide with the direction of movement of the nut member controlled by the upper column. Therefore, an unreasonable force is applied to the portion at which the nut member is fixed to a fixed bracket, the threadably engaged portions of the nut member and the screw shaft, and the connecting portion between the screw shaft whereby the upper column, and smooth tilt is difficult.

OBJECTS AND SUMMARY OF THE INVENTION

The present invention has been made with the above-described circumstances as background, and an object thereof is to provide an electric steering apparatus which requires a minimized number of parts, which is very simple in structure and easy to work, and in which occurrence of back lash in the threadably engaged portions of a screw shaft and a nut member, a hinge portion and a speed reduction mechanism can be effectively prevented.

Another object of the present invention is to provide an electric steering apparatus in which the drive force by a screw shaft can be smoothly transmitted to an upper steering column without complicating the structure and without increasing the number of coupled portions.

To solve the above-noted problems, the present invention, provides an electric steering apparatus in which a lower shaft having one end connected to a steering gear is rotatably contained in a bracket and a lower column fixed to a vehicle body, an upper shaft having a steering wheel at one end thereof is rotatably contained in an upper column, the other end of said lower shaft and the other end of said upper shaft are connected to each other, a screw shaft having a screw portion at one end thereof is disposed in said upper column substantially parallel to said two columns near a coupling portion coupled to adjust the position of said steering wheel relative to said bracket, a nut member rotatably supported by a housing fixed to said bracket but help against movement in the axial direction of said screw shaft is threadably engaged with the screw portion of said screw shaft, the other end of said screw shaft is connected to said upper column, said nut member is rotatively driven by an electric motor to move said screw shaft in the axial direction and thereby move said upper column, back-lash preventing means presses said screw shaft against said nut member in a radial direction such that threadably engaged portions of said screw shaft and said nut member are urged against each other.

Since said screw shaft is pressed against said nut member in a radial direction and the threadably engaged portions of the two members are urged against each other, the left and right tooth surfaces of the threads of the threadably engaged portions are pressed into contact with each other, whereby back-lash of the threadably engaged portions is prevented and the hinge portion of the screw shaft is pressed in one direction to achieve, pre-pressed contact free of back-lash.

Further, the back-lash of the screw shaft in the direction of rotation about the axis thereof which would otherwise be caused by the back-lash of the hinge portion is also prevented by the resistance of means for pressing the screw shaft and of the screw shaft.

Furthermore, in the present invention, the nut member threadably engaged with the screw shaft and rotatably supported by the fixed bracket is made pivotable in the same direction as the direction of tilt of the upper column. Therefore, even if during tilt the screw shaft pivotally moves in the same direction as the direction of tilt of the upper column, the nut member can pivotally move and absorb the tilt of the screw shaft, so that said unreasonable force is not produced. The nut member is threadably engaged with the screw shaft and supported by the fixed bracket against movement in the axial direction of the screw shaft, and is rotatively driven about the screw shaft by the electric motor during tilt. As a mode for pivotally supporting the nut member, for example, a bearing capable of self-aligning may be suitably utilized.

DESCRIPTION OF THE PREFERRED EMBODIMENTS

Figure 1:
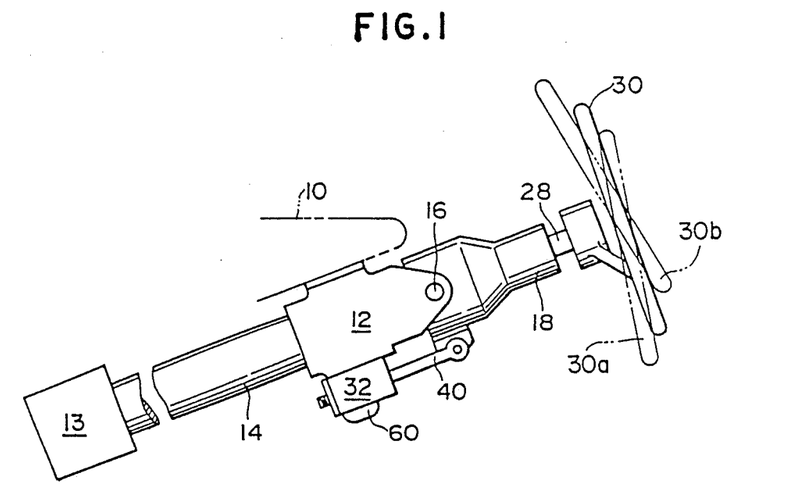
FIG. 1 is a front view showing a first embodiment of the present invention.
Figure 2:
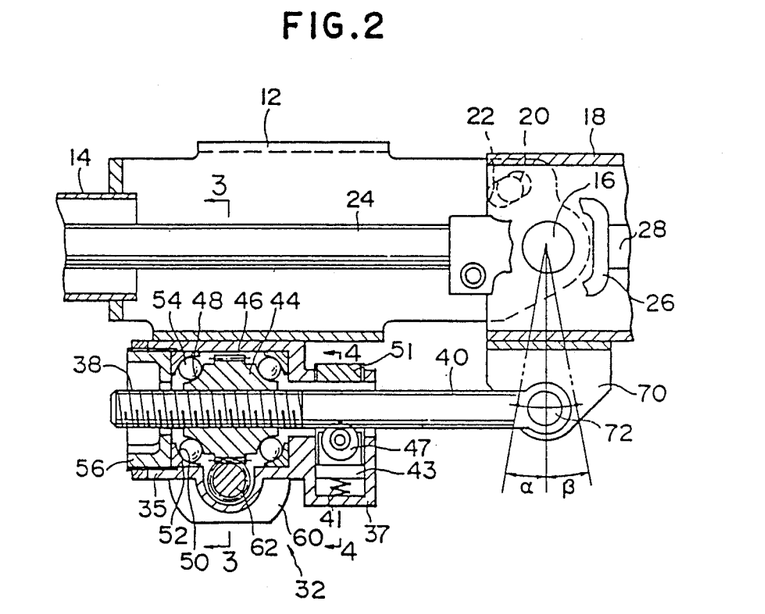
FIG. 2 is a longitudinal cross sectional view of portions of FIG. 1.

Some embodiments of the present invention will hereinafter be described with reference to an drawings FIGS. 1 and 2 show the electric tilt steering apparatus of the present invention.

A fixed bracket 12 of U-shaped cross-section is fixed to the body portion 10 of a vehicle, and a lower column 14 is fixed to the fixed bracket 12 and an upper column 18 is tiltably mounted to the fixed bracket 12 by means of a tilt pin 16. A pin 20 fixed to the upper column 18 extends into an arcuate slot 22 formed in the fixed bracket 12, and the tilting movement of the upper column 18 may be controlled by the pin 20 bearing against the side edge of the arcuate slot 22. A lower steering shaft 24 extends in the lower column 14 and the fixed bracket 12, and the lower end portion thereof (the left end portion as viewed in FIG. 2) is connected to the steering gear 13 of a wheel.

Figure 3:
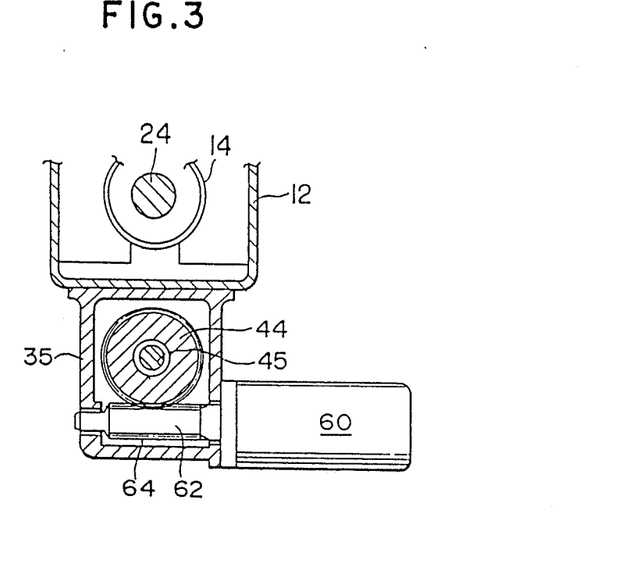
FIG. 3 is a cross-sectional view taken along line 3—3 of FIG. 2.

On the other hand, the upper end portion of the lower steering shaft 24 is connected to an upper steering shaft 28 through a universal joint 26. A steering wheel 30 (see FIG. 1) is fixed to the upper end portion (the right end portion as viewed in FIG. 2) of the upper steering shaft 28. Thus,,if the steering wheel 30 is rotated, torque will be transmitted by the upper steering shaft 28, the universal joint 26 and the lower steering shaft 24 with a result that the wheels will be steered. As shown in FIGS. 2 and 3, a housing 32 is fixed to the underside of the fixed bracket 12, and this housing comprises a first portion 35 and a second portion 37. A screw shaft 40 having a male screw 38 extends from the housings first portion to a point beside the upper column 18, and the female screw 45 of an inner race (worm wheel) 44, which is a nut member is threadably engaged with the male screw 38. A gear 46 having teeth gently curved so that the faces of the teeth become outwardly convex is formed on the axially intermediate portion of the inner race 44, and a pair of ball rolling grooves 48 are annularly formed in the outer surfaces of the opposite sides thereof. A pair of outer races 52 having in the inner surfaces thereof annular ball rolling grooves 50 opposed to the ball rolling grooves 48 of the inner race are disposed in the first portion 35 of the housing, and balls 54 are interposed for rolling between the opposed ball rolling grooves 48 and 50. A pair of angular bearings are formed by the inner race 44, the outer races 52 and the balls The angular bearings are prepressed in the axial direction by a cover 56 threadably engaged with an entrance portion of the first portion 35 of the housing and are thus maintained in their assembled state.

A worm gear 64 formed on the output shaft 62 of an electric motor 60 fixed to the first portion 35 of the housing fits to the gear 46 of said worm wheel. when the electric motor 60 is driven, the output shaft 62 may be rotated and the rotation of the worm gear 64 may be transmitted to the worm wheel 44 and decelerated, and by the rotation of the worm wheel 44, the screw shaft 40 may be moved in the axial direction (the left to right direction as viewed in FIG. 2, or a direction perpendicular to the plane of the drawing sheet as viewed in FIG. 3).

Figure 4:
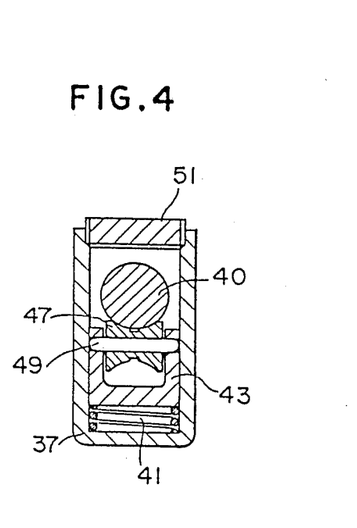
FIG. 4 is a cross-sectional view taken along line 4—4 of FIG. 2.

As shown in FIGS. 2 and 4, the second portion 37 of the housing 32 is of a vertically elongate shape, and a holder 43 is disposed at the bottom thereof with a spring 41 interposed therebetween. An hourglass roller 47 is rotatably mounted on the holder by means of a pin 49. The roller 47 is in contact with a non-threaded portion of the screw shaft 40 and biases the screw shaft 40 in a direction orthogonal to the axial direction thereof The opening in the second portion 37 of the housing is closed by a blank cap 51 after the holder 43, the roller 47, etc. have been inserted therein A bracket 70 of U-shaped cross-section having the opposite ends thereof folded is fixed to the underside of the upper column 18, an end portion of the screw shaft 40 extends between the folded portions, and is pivotally connected to the bracket 70 by a pin 72 to thereby form a hinge portion.

Operation of the present embodiment will now be described.

When the vehicle driver operates a designated switch (not shown), in FIG. 2, the electric motor 60 is operated and the output shaft 62 thereof is rotated, so that the screw shaft 40 is moved axially through the meshing engagement between the worm gear 64 and the worm wheel 44 and the threadable engagement between the worm wheel 44 and the screw shaft 40.

Here, considering a case where the screw shaft 40 has been moved in the leftward direction as viewed in FIG. 2, the pin 72 is moved in the leftward direction and therefore, the bracket 70 and the upper column 18 are turned rightwardly as a unit about the tilt pin 16. As a result, the upper steering shaft 28 and the steering wheel 30 are set at lower positions. The amount of tilt of the steering wheel 30 is determined by the amount of movement of the screw shaft 40 caused by the electric motor 60, and the maximum amount of tilt downward from the neutral position is determined by the pin 20 of the upper column bearing against the right side edge of the arcuate slot 22 formed in the fixed bracket 12 (at this time, the wheel 30 is in a position indicated by 30a in FIG. 1).

The angle of rock of the pin 72 corresponding thereto is indicated by α in FIG. 2.

On the other hand, the upward tilt of the steering wheel 30 (the rightward movement of the screw shaft 40 as viewed in FIG. 2) is accomplished by rotating the electric motor 60 in the opposite direction by the operation of a switch to thereby move the screw shaft 40 in the rightward direction as viewed in FIG. 2 and leftwardly turn the upper column 18 and the upper steering shaft 28 about the tilt pin 16. The amount of tilt of the steering wheel 30 upward from the neutral position is determined by the pin 20 bearing against the left side edge of the arcuate slot 22, and then the position of the wheel 30 is indicated by 30b in FIG. 1. Also, the angle of rock of the pin 72 corresponding thereto is indicated by β in FIG. 2.

In this embodiment, provision is made such that during the tilt of the steering wheel 30, there is produced no unreasonable force between the screw shaft 40 and the housing 32 and bracket 70 associated therewith.

That is, during the tilting movement of the bracket 70 caused by movement of the screw shaft 40, the pin 72 moves on an arc centered at the tilt pin 16, and the other end portion of the pin 72, i.e., the screw shaft 40, is slightly displaced in a direction substantially perpendicular to the axial direction of the screw shaft 40 (the direction of tilt of the upper column 18), with a result that the entire screw shaft 40 is slightly tilted about the portion thereof which is contained in the housing 32.

Also, as previously described, the male screw 38 of the screw shaft 40 and the female screw 45 of the worm wheel 44 are in ordinary threadable engagement. However, according to the present embodiment, the occurrence of back-lash between these components is effectively prevented. That is, a roller 47 is resiliently urged against the screw shaft 40 by a spring 41, the screw shaft 40 is pressed in a radial direction against the nut member (worm wheel) 44, the threadably engaged portions of the screw shaft 40 and the nut member 44 are urged in one direction and the left and right tooth surfaces of the thread are in contact with each other so that no back-lash of the threadably engaged portions occurs. The roller 47 is made rotatable and therefore, when the screw shaft 40 is moved in the axial direction, the roller 47 rotates to guide it and does not interfere with the movement of the screw shaft.

Because member 44 singularly serves as a nut threadably engaged with the screw shaft 40, as a worm wheel and as the inner race of an angular bearing the construction of the invention is compact and requires only a small number of parts. Also, forming a pair of angular bearings and forming the outer tooth surface of the gear 46 in the direction of tooth trace into a gently arcuate shape is effective to make self-alignment of the nut member 44 smoother.

Figure 5:
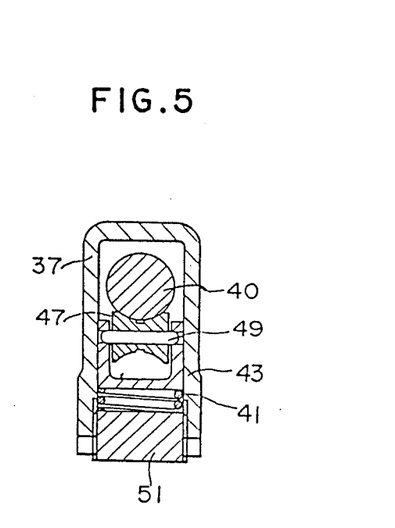
FIG. 5 is a cross-sectional view showing a modification of the first embodiment and corresponding to FIG. 4.

The second portion 37 of the housing 32 may be made into a downwardly open shape as shown in FIG. 5, and a holder 43 supporting the roller 47 by a pin 49 may be mounted through the opening and the spring 41 may be mounted, whereafter a lid member 51 may be threadably engaged with the opening portion. If this is done, the compression length of the spring 41 can be changed by adjusting the position of the lid member 51, and the magnitude of the resilient force applied from the roller 47 to the screw shaft 40 can be adjusted.

An electric telescopic steering apparatus of the present invention will now be described with reference to FIGS. 6 and 7.

The lower column 14 and the upper column 18 are telescopically fitted to each other, and the upper shaft 28 is rotatably supported on the upper column 18 by means of a ball bearing 27. A spline tube 31 is fixedly fitted to the lower end of the upper shaft 28, and a spline 33 formed in the lower shaft 24 is spline-fitted to the spline tube 31.

The housing 32 comprising the first portion 35 and the second portion 37 is coupled to the lower column 14, and the screw shaft 40 extends through the two portions. The worm wheel 44 is threadably engaged with the male screw 38 of the screw shaft 40 and is rotatably supported by a pair of thrust ball bearings 39 disposed in the first portion 35. The gear portion 46 of the worm wheel 44 is in meshing engagement with the worm gear 64 formed on the output shaft 62 of the motor 60.

In the second portion 37 of the housing 32, as in the embodiment shown in FIG. 4, the hourglass roller 47 is supported by a holder 43 through the intermediary of a pin 49 and is resiliently urged against the screw shaft 40 by the action of the spring 41.

Figure 6:
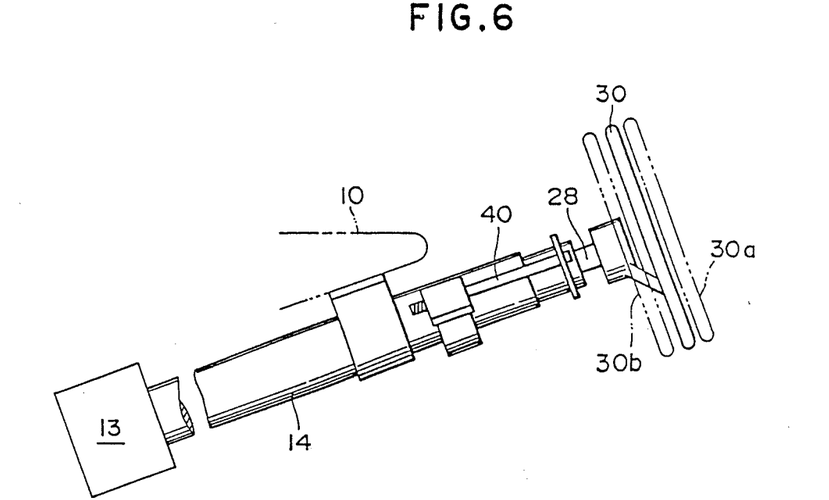
FIG. 6 is a front view showing a second embodiment of the present invention.
Figure 7:
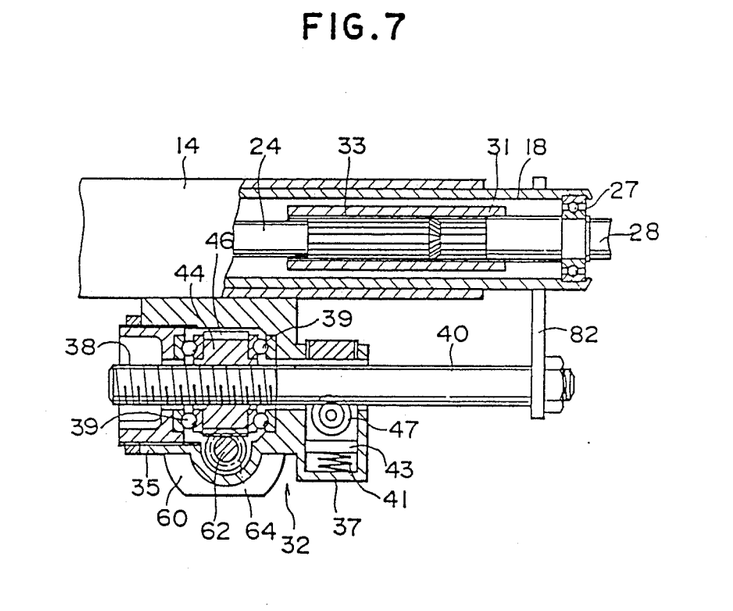
FIG. 7 is a longitudinal cross-sectional view of portions of FIG. 6.

According to the present embodiment, the worm gear 64 is rotated by rotation of the motor 60 and, when the worm wheel 44 is rotated, the screw shaft 40 is moved axially As a result, the upper column 18, the upper shaft 28 and the spline tube 31 are moved as a unit through the intermediary of a support plate 82, and the steering wheel 30 can be adjusted to any position between the upper limit position indicated by 30a in FIG. 6 and the lower limit position indicated by 30b.

The back-lash which would otherwise occur in the threadably engaged portions of the worm wheel 44 and screw shaft 40 during this position adjustment and during the fixing does not occur for a reason similar to what has been previously set forth in connection with the first embodiment—that is, by the roller 47 being resiliently urged against the screw shaft 40 by the spring 41 and the screw shaft 40 being pressed in one radial direction against the worm wheel 44.

The urging member need not always be a rotational member like the roller 47 in the above-described embodiment, but may be an ordinary (non-rotational) member Also, the urging member may be adjusted not by the use of the resilient pressure by the spring 41, but by causing the lid member 51 to directly bear against the holder 43.

By the above-described construction and operation, the nut member, the screw shaft and the hinge portion of the screw shaft are pushed in one direction, the cross-section of the screw portion is such that the left and right tooth surfaces of the thread are urged against each other, and the hinge portion is such that the bearing portion is pressed in one direction. Therefore, pre-pressed contact which is free of back-lash in all directions can be provided. There is no back-lash of the upper column coupled to the screw shaft or of the upper shaft and steering wheel rotatably supported on the upper column. Thus, in accordance with the invention, there can be provided an electric steering apparatus in which the sense of rigidity is not spoiled, stability of manipulation is increased and occurrence of vibrations and noise is prevented.

Third and fourth embodiments of the present invention will now be described with reference to the drawings.

Figure 8:
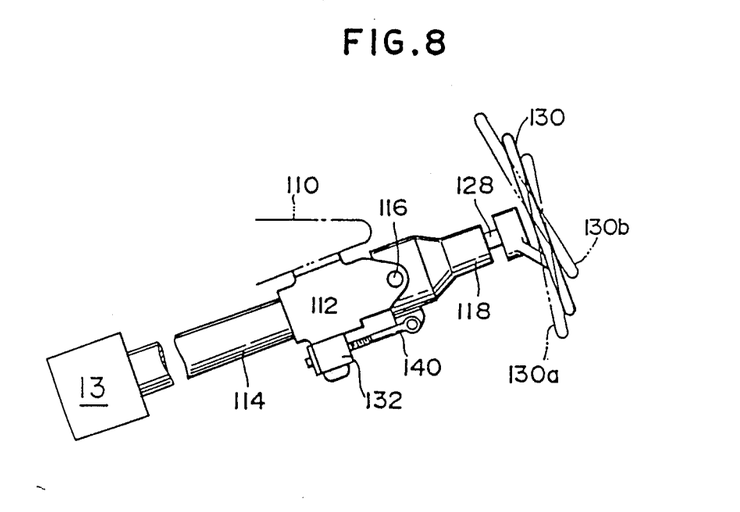
FIG. 8 is a front view showing a third embodiment of the present invention.
Figure 9:
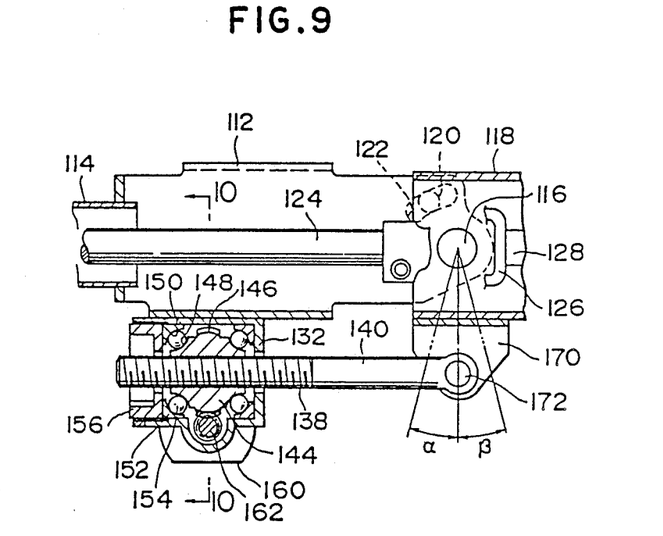
FIG. 9 is a cross-sectional view of portions of FIG. 8.

As shown in FIGS. 8 and 9, a fixed bracket 112 of U-shaped cross-section is fixed to the body portion 110 of a vehicle, and a lower column 114 is fixed to the fixed bracket 112 and an upper column 118 is tiltably mounted to the fixed bracket by means of a tilt pin 116. A pin 120 fixed to the upper column 118 extends into an arcuate slot 122 formed in the bracket 112, and the tilting movement of the upper column 118 may be controlled by the pin 120 bearing against the side edge of the arcuate slot 122 A lower steering shaft 124 extends in the lower column 114 and the fixed bracket 112, and the lower end portion thereof (the left end portion as viewed in FIG. 9) is connected to the steering device (not shown) of a wheel. On the other hand, the upper end portion of the lower steering shaft 124 is connected to an upper steering shaft 128 through a universal joint 126. A steering wheel 130 is fixed to the upper end portion (the right end portion as viewed in FIG. 8) of the upper steering shaft 128 Thus, if the steering wheel 130 is rotated, torque will be transmitted by the upper steering shaft 128, the universal joint 126 and the lower steering shaft 124 with a result that the wheels will be steered.

Figure 10:
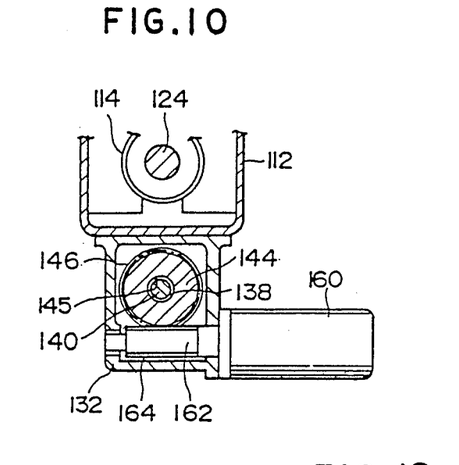
FIG. 10 is a cross-sectional view taken along line 10—10 of FIG. 9.

As shown in FIGS. 9 and 10, a housing 132 is fixed to the underside of the fixed bracket 112, and this housing generally presents a bottomed cylindrical shape. A screw shaft 140 having a male screw 138 extends from the housing 132 to the upper column 118 side, and the female screw 145 of an inner race (worm wheel) 144 which serves as a nut member is threadably engaged with the male screw 138. A gear 146 having teeth gently curved so that the faces of the teeth become outwardly convex is formed on the axially intermediate portion of the inner race 144, and a pair of ball rolling grooves 148 are annularly formed in the outer surfaces of the opposite sides thereof A pair of outer races 152 having in the inner surfaces thereof annular ball rolling grooves 150 opposed to the ball rolling grooves 148 of the inner race are disposed in the housing 132, and balls 154 are interposed for rolling between the opposed ball rolling grooves 148 and 150. A pair of angular bearings are formed by the inner race 144, the outer races 152 and the balls. The angular bearings are pre-pressed in the axial direction by a cover 156 threadably engaged with the entrance portion of the housing 132 and are thus maintained in their assembled state.

A worm gear 164 formed on the output shaft 162 of an electric motor 160 fixed to the housing 132 is in meshing engagement with the gear 146 of said worm wheel. When the electric motor 160 is driven, the output shaft 162 may be rotated and the rotation of worm gear 164 may be transmitted to the worm wheel 144 and decelerated, and by the rotation of the worm wheel 144, the screw shaft 140 may be moved in the axial direction (the left to right direction as viewed in FIG. 9, or a direction perpendicular to the plane of the drawing sheet as viewed in FIG. 10).

A bracket 170 of U-shaped cross-section having the opposite ends thereof folded is fixed to the underside of the upper column 118, and an end portion of the screw shaft 140 extends between the folded portions and is pivotally connected to the bracket 170 by a pin 172.

Operation of the present embodiment will now be described.

When the driver operates a designated switch (not shown), the electric motor 160 is operated and the worm 162 is rotated, so that the screw shaft 140 is moved axially through the meshing engagement between the worm 164 and the worm wheel 144 and the threadable engagement between the worm wheel 144 and the screw shaft 140.

Here, considering a case where the screw shaft 140 has been moved in the leftward direction as viewed in FIG. 9, the pin 172 is moved in the leftward direction whereby, the bracket 170 and the upper column 118 are turned rightwardly as a unit about the tilt pin 116 and, the upper steering shaft 128 and the steering wheel 130 are set at lower positions. The amount of tilt of the steering wheel 130 is determined by the amount of movement of the screw shaft 140 caused by the electric motor 160, and the maximum amount of tilt downward from the neutral position is determined by the pin 120 of the upper column bearing against the right side edge of the arcuate slot 122 (at this time, the wheel 130 is in a position indicated by 130a in FIG. 8). The angle of rock of the pin 172 corresponding thereto is indicated by $\alpha$ in FIG. 9.

On the other hand, the upward tilt of the steering wheel 130 is accomplished by rotating the electric motor 160 in the opposite direction by the operation of a switch to thereby move the screw shaft 140 in the rightward direction as viewed in FIG. 9 and leftwardly turn the upper column 118 and the upper steering shaft 128 about the tilt pin 116. The amount of tilt of the steering wheel 130 upward from the neutral position is determined by the pin 120 bearing against the left side edge of the arcuate slot 122, and the then position of the wheel 130 is indicated by 130b in FIG. 8. Also, the angle of rock of the pin 172 corresponding thereto is indicated by $\beta$ in FIG. 9.

During the tilting movement of the bracket 170 caused by movement of the screw shaft 140, the pin 172 moves on an arc centered at the tilt pin 116, and the other end portion of the pin 172, i.e., the screw shaft 140, is slightly displaced in a direction substantially orthogonal to the axial direction of the screw shaft 140 in (the direction of tilt of the upper column 118), with a result that the entire screw shaft 140 is slightly tilted about the portion thereof which is contained in the housing 132. Accordingly, at this time, there is produced no unreasonable force between the screw shaft 140 and the members 132 and 170 associated therewith The reason is that one end portion of the screw shaft 140 is supported for tilting about this portion in the housing 132 by the pair of angular bearings through the worm wheel 144 which is a nut member.

Because member 144 singularly serves as a nut threadably engaged with the screw shaft 140, a worm wheel and the inner race of an angular bearing the resulting construction is compact and has only a small number of parts. Also, forming a pair of angular bearings and forming the outer tooth surface of the gear 146 into a gently arcuate shape is effective to make the self-aligning of the nut member 144 smoother. Also, the nut member 144 and the member 152 associated therewith are adapted to be pressed and positioned by a cover 156 threadably engaged with the housing 132 wherefore, no back-lash occurs and the pre-pressure adjustment of the bearings is easy.

Figure 11:
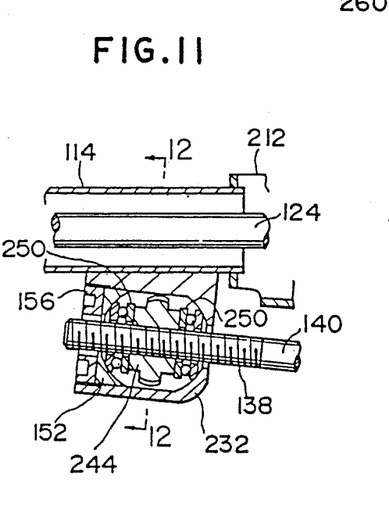
FIG. 11 is a cross-sectional view of the principal portions of a fourth embodiment of the present invention.
Figure 12:
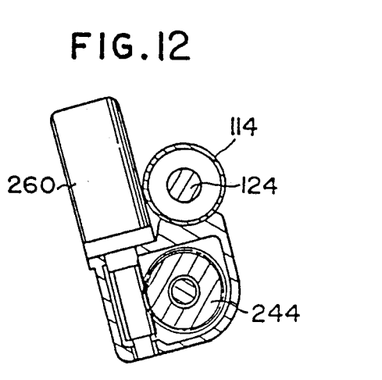
FIG. 12 is a cross-sectional view taken along line 12—12 of FIG. 11.

Another embodiment of the present invention will now be described with reference to FIGS. 11 and 12.

The features of this embodiment are such that a nut member 244 threadably engaged with the screw shaft 140 is supported for self-alignment relative to a housing 232 by a thrust ball bearing 250 having a pair of aligning washers and that an electric motor 260 is disposed in proximity to the lower column 114 and in a direction substantially orthogonal thereto so as to provide a compact structure. As will be apparent, the construction (the shape) of the nut member 244 becomes simple and there is flexibility in the disposition of the electric motor 260.

The present invention is not restricted to the above-described embodiments, and may be modified in various ways consistent with the principles described herein.

According to the present invention, in an electric tilt steering apparatus, the nut member threadably engaged with the screw shaft for tilting the upper column and rotatively driven by the electric motor is made capable of self-aligning in the direction of tilt of the upper column, i.e., the same direction as the direction of rock of the screw shaft. As a result, during the tilt, no unreasonable force is applied between the screw member and the nut member and the members associated with them, and it is not necessary to utilize a link mechanism as in the prior art furthermore, the problem of back-lash is eliminated, the structure becomes simple and the number of parts is reduced to thereby reduce the cost of manufacture.

We claim:

1. An electric steering apparatus comprising:
   a lower column fixed to a vehicle body and having a housing provided thereon;
   an upper column having a tilting pivot portion and a screw shaft pivot portion, said upper column being pivotally attached to said lower column at said tilting pivot portion so as to be tiltable with respect to said lower column;
   a lower shaft rotatably received in said lower column and having a first end and a second end, said first end being connected to a steering gear;
   an upper shaft rotatably received in said upper column for tilting with said upper column and having a first end connected to a steering wheel and a second end connected to said second end of said lower shaft through a universal joint such that an angle formed between respective axes of said upper and lower shafts may be changed by tilting of said upper shaft with said upper column;
   a screw shaft having a non-threaded first end portion pivotally connected directly to said screw shaft pivot portion of said upper column, and a second end portion formed with a screw thread;
   nut means rotatable by an electric motor and having a threaded portion engaged with said screw thread of said screw shaft;
   antifriction bearing means mounted in said housing and comprising two inner races provided on a surface of said nut means, two outer races fitted in said housing, and two groups of rolling members provided between said inner races and said outer races, said antifriction bearing means being mounted in said housing in such a manner as to support said nut means for rotation relative to said screw thread and as to prevent said nut means from moving in an axial direction of said lower column and from moving in a direction perpendicular to said lower column, said screw shaft thus moving in the axial direction of said lower column upon rotation of said nut means by said motor while pivoting relative to said screw shaft pivot portion;
   aligning means for aligning a rotational axis of said nut means with an axis of said screw shaft during said pivoting of said screw shaft; and
   back-lack eliminating means for eliminating back-lash by pressing on an outer surface of said screw shaft such that said screw thread presses against said threaded portion of said nut means.

2. An electric steering apparatus according to claim 1, wherein said aligning means includes said outer races of said antifriction bearing means, and said outer races are configured such that said rolling members of said antifriction bearing means shift along said outer races in accordance with the pivoting movement of said screw shaft.

3. An electric steering apparatus according to claim 1, wherein said aligning means includes curved inner portions of said housing, and said outer races of said antifriction bearing means are configured to shift along said curved inner portions in accordance with the pivoting movement of said screw shaft.

4. An electric steering apparatus according to claim 1, wherein said back-lash eliminating means also presses said first end portion of said screw shaft toward said screw shaft pivot portion of said housing.

5. An electric steering apparatus comprising:
   a lower column fixed to a vehicle body and having a housing provided thereon;
   an upper column telescopically connected to said lower column;
   a lower shaft rotatably received in said lower column and having a first end and a second end, said first end being connected to a steering gear;
   an upper shaft rotatably received in said upper column for movement with said upper column relative to said lower column and having a first end connected to a steering wheel and a second end connected to said second end of said lower shaft such that the connected second ends may move axially but not rotatably relative to each other;
   a screw shaft having a non-threaded first end portion connected to said upper column and a second end portion formed with a screw thread;
   nut means rotatable by an electric motor and having a threaded portion engaged with said screw thread of said screw shaft;
   antifriction bearing means mounted in said housing and comprising two inner races provided on a surface of said nut means, two outer races fitted in said housing, and two groups of rolling members provided between said inner races and said outer races, said antifriction bearing means supporting said nut means in such a manner as to prevent said nut means from moving in an axial direction of said lower column but to permit said nut means to rotate relative to said screw shaft, said screw shaft thus moving in the axial direction of said lower column upon rotation of said nut means by said motor;
   first back-lash eliminating means for eliminating back-lash by pressing an outer surface of said screw shaft so that said screw thread of said screw shaft presses against said threaded portion of said nut means; and
   second back-lash eliminating means for eliminating back-lash by pressing said antifriction bearing means so that each said inner race presses against a corresponding said outer race through an associated one of said groups of rolling members.

6. An electric steering apparatus according to claim 5, wherein said second back-lash eliminating means comprises male and female threaded members engaged with one another and threadably adjustable for pressing against said antifriction bearing means to eliminate backlash associated with said antifriction bearing means.

7. An electric steering apparatus comprising:
a lower column fixed to a vehicle body;
an upper column having a tilting pivot portion and a screw shaft pivot portion, said upper column being pivotally attached to said lower column at said tilting pivot portion so as to be tiltable with respect to said lower column;
a lower shaft rotatably received in said lower column and having a first end and a second end, said first end being connected to a steering gear;
an upper shaft rotatably received in said upper column for tilting movement with said upper column and having a first end connected to a steering wheel and a second end connected to said second end of said lower shaft through a universal joint such that an angle formed between respective axes of said upper and lower shafts may be changed by tilting of said upper shaft with said upper column;
a screw shaft having a non-threaded first end portion pivotally connected directly to said screw shaft pivot portion of said upper column, and a second end portion formed with a screw thread;
nut means rotatable by an electric motor and having a threaded portion engaged with said screw thread of said screw shaft;
antifriction bearing means supporting said nut means for rotating relative to said screw thread and in such a manner as to prevent said nut means from moving in an axial direction of said lower column and from moving in a direction perpendicular to said lower column, said screw shaft thus being movable in the axial direction of said lower column upon rotation of said nut means by said electric motor while pivoting relative to said screw shaft pivot portion;
aligning means for aligning a rotational axis of said nut means with the axis of said screw shaft during movement of said screw shaft; and
pressing means for pressing said antifriction bearing means to eliminate back-lash.

8. An electric steering apparatus according to claim 7, including a housing provided on said lower column, and wherein:
said antifriction bearing means comprises two inner races provided on a surface of said nut means, two outer races fitted in said housing, and two groups of rolling members provided between said inner and outer races, and
said pressing means comprises male and female threaded members engaged with one another and threadably adjustable for pressing against said antifriction bearing means to eliminate back-lash associated with said antifriction bearing means.

9. An electric steering apparatus according to claim 7, wherein said aligning means includes said outer races of said antifriction bearing means, and said outer races are configured such that said rolling members of said antifriction bearing means shift along said outer races in accordance with the pivoting movement of said screw shaft.

10. An electric steering apparatus according to claim 7, including a housing provided on said lower column, and wherein said aligning means includes curved inner portions of said housing, and said outer races of said antifriction bearing means are configured to shift along said curved inner portions in accordance with the pivoting movement of said screw shaft.

* * * * *